Patented Nov. 17, 1953

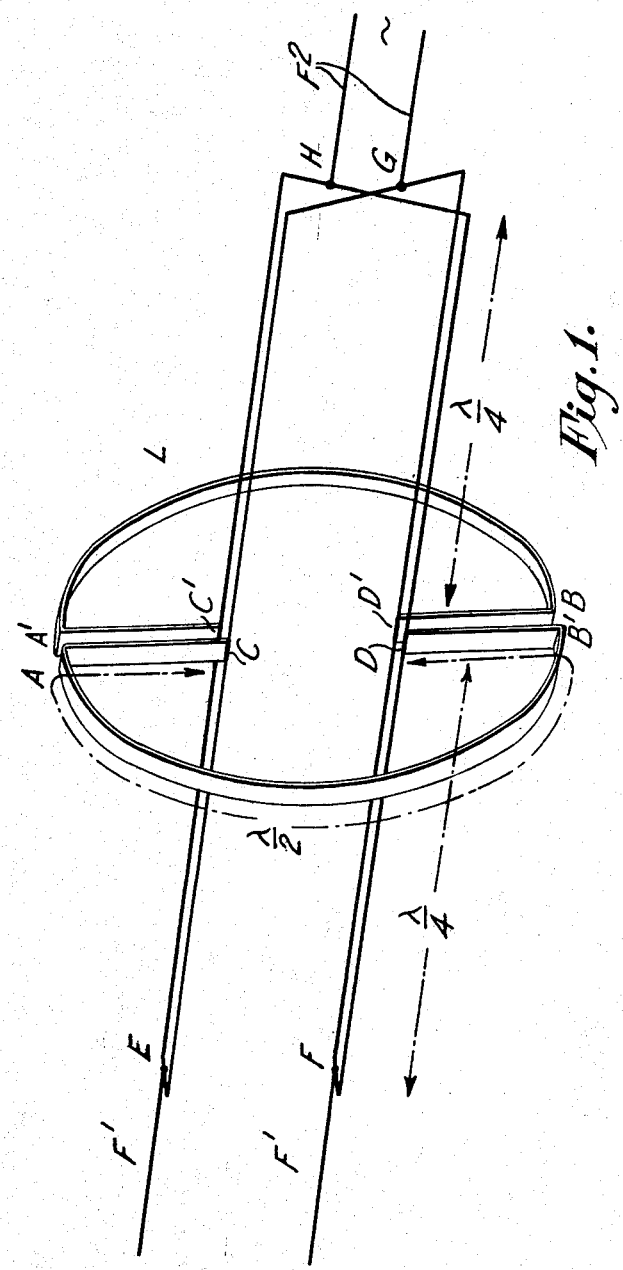

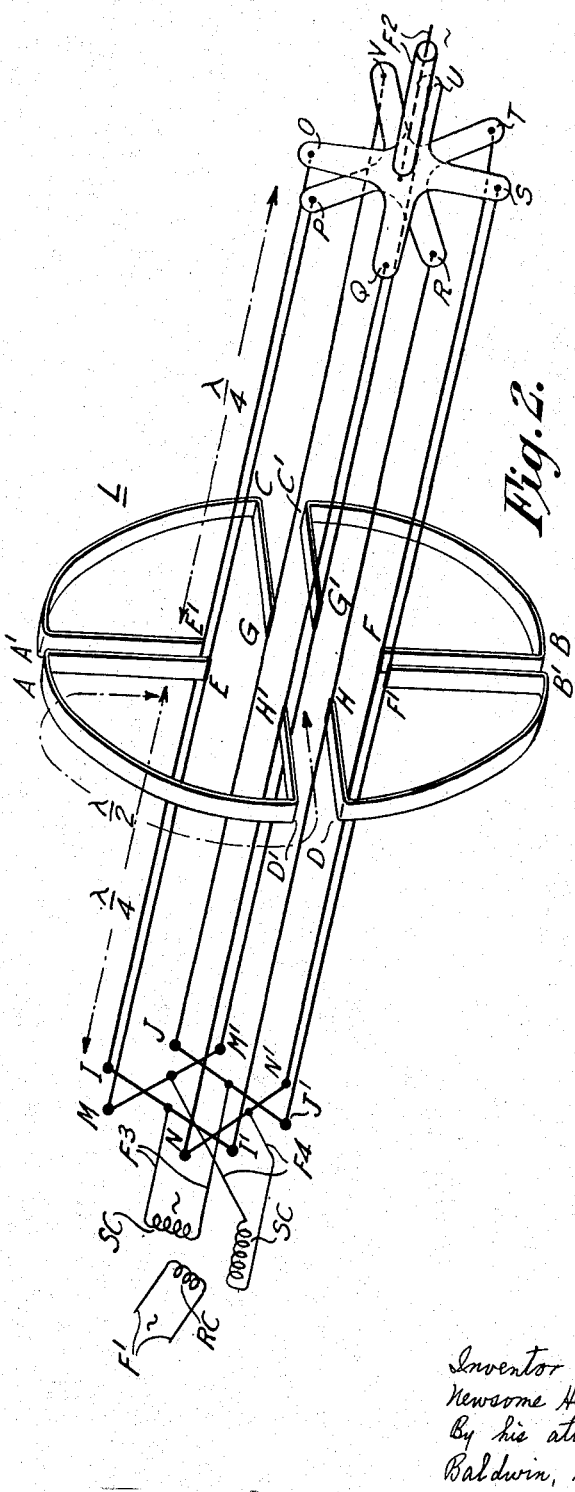

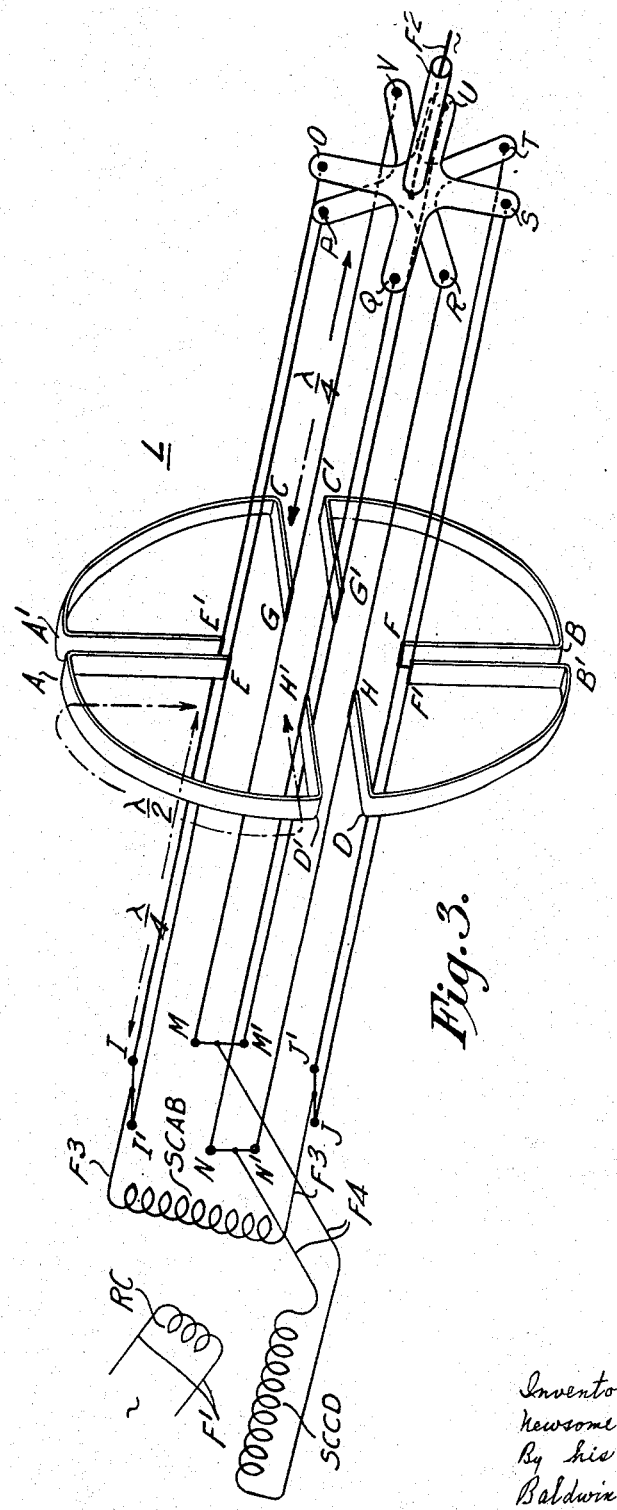

2,659,819

UNITED STATES PATENT OFFICE 2,659,819

AERIAL SYSTEM

Newsome Henry Clough, Brentwood, England, assignor to Marconi's Wireless Telegraph Company Limited, London, England, a company of Great Britain Application May 1, 1950, Serial No. 159,199

7 Claims. (Cl. 250—33.67)

This invention relates to aerial systems and has for its object to provide improved and simplified aerial systems having a polar radiation diagram consisting in effect of a combination of an approximately circular diagram with an approximately figure of eight diagram: that is to say having a cardioid limaçon or similar polar diagram. Such aerials are often required in radio directional systems, in particular in so-called omni-directional beacons (O. R. B.) transmitters. In such systems, as is well known the cardioid or similar pattern is continuously rotated, often by mechanically rotating the aerial system.

In mechanically rotating O. R. B. systems considerable practical difficulties are experienced due to the necessity for rotation at high speeds. It is generally required that the center of the circular "component" of the polar diagram shall be as nearly as possible co-incident with that of the figure-of-eight component; that the polarization shall be true, i. e. if (as is usual) the radiation is required to be horizontally polarized, there shall be no vertical component of polarization; and that, in the case of installations for aiding the the navigation of aircraft, the diagrams of the aerial system taken in parallel planes between a horizontal plane passing through the said system and the operational aircraft ceiling, shall be if not similar (the ideal requirement), reasonably near similarity. Aerial systems for O. R. B. transmitters and which consist of two elements—a fixed loop or the like and a rotating dipole or the like—fall short of satisfying these difficult requirements. Moreover, they are not inherently well suited to mechanical rotation and where, as is common, high speeds of rotation are required, the necessity for maintaining good mechanical balance and adequate mechanical strength leads to considerable difficulties.

The present invention, in certain of its embodiments, provides aerial systems which can be satisfactorily designed for mechanical rotation at the required high speeds. In other, preferred, embodiments, the invention provides improved aerial systems whereby the required rotation of the polar diagram is obtained purely electrically, i. e. without mechanical rotation of any aerial part or element at all.

According to this invention an aerial system having a cardioid or similar polar radiation diagram is in the form of a loop or frame which is interruped at the opposite ends of at least one diameter or bisector, as the case may be, and the points on each side of each of the two interruptions are joined by symmetrically disposed conductors to two pairs of feed points symmetrically positioned with respect to the axis of said loop or frame, there being four pairs of resonant quarter wave lines associated with said feed points, the two pairs of lines with each pair of feed points, and the length round the loop or frame, from one point of a pair of feed points to the corresponding point of the other pair, being substantially half a wave length.

By the expression "quarter wave lines" is meant lines a quarter of the working wave length long electrically or an odd multiple thereof.

Preferably the loop or frame is circular and the quarter wave lines run parallel to the axis of the frame.

Two feeder systems are provided for the four pairs of lines, one being a two-wire feeder connected between short circuiting elements at the far ends of one pair of lines, one associated with one pair of adjacent feeder points on the loop and the other with the other, the second feeder system being also a two wire feeder having its wires connected to elements which cross connect the far ends of the wires of the remaining pairs of lines. As will be appreciated the aerial will have two modes of oscillation and for a cardioid or similar diagram of transmission or reception the currents corresponding to the said two modes will be in quadrature.

In accordance with a preferred extension of the invention the loop or frame is interrupted at the ends of two mutually perpendicular diameters or bisectors, as the case may be, and the points on each side of each of the four interruptions are joined by symmetrically disposed conductors to one or other of four pairs of feed points which are symmetrically positioned with respect to the axis, there being eight pairs of resonant quarter wave lines associated with said feed points and the lengths round the loop or frame from one point of a pair of feed points to the adjacent point of the next pair being substantially half a wave length.

Preferably again the loop or frame is circular and the wires of the quarter wave lines run parallel with the axis of the frame, there being eight wires on one side of the plane containing the frame and eight on the other, each wire on one side being substantially co-linear with a wire on the other.

The wires of the lines are interconnected at the far ends to provide three pairs of feeder terminals, two on one side of the plane of the frame and one on the other. The feeds to said two pairs of terminals are preferably made from a common feeder through a radio goniometer or its equivalent so that these two feeds are taken from the stator coils of said goniometer while a separate feeder is connected to said one pair of terminals. The loop currents corresponding to the last mentioned feed are in quadrature with those corresponding to the feed from the others. With this arrangement, and assuming that the feeder connections are such that the loop currents first mentioned have continuity of direction round successive segmental arcs of the loop, if the rotor of the goniometer is rotated, the resultant cardioid diagram will rotate correspondingly without any mechanical movement of the aerial system.

As will now be seen an aerial in accordance with the invention and adapted to have a cardioid or similar polar diagram three limbs with a capacity in each limb, the outer limbs tuning together in series to provide one electrical degree of freedom and in parallel with one another and in series with the middle limb to provide a second electrical degree of freedom. The aerial has therefore two modes of operation in one of which currents flow round the segmental arcs of a circle (assuming the aerial to be of circular general shape) so as to produce an almost uniform peripheral current. In the other mode of operation currents flow across a diameter of the aerial and then divide, going in opposite directions round the periphery.

The invention is illustrated in the accompanying drawings which show diagrammatically three embodiments, Figure 1 being a perspective view of an embodiment comprising an interrupted loop with four feeder points connected to line wires running transversely to the loop; Fig. 2 being a similar view of an embodiment with an interrupted loop with eight feeder points connected to transverse line wires; and Fig. 3 similarly showing a modification also including an interrupted loop with eight feeder points connected to transverse line wires. For convenience in drawing the embodiments are shown with loops or frames in a vertical plane. In practice, however, the loops or frames will generally be horizontal and may be mounted, in each case, in a vertical tower or guide having a horizontal ring of radiating slots in whose median plane said loop or frame is positioned.

Referring to Fig. 1 a loop generally designated L is interrupted at AA' and at BB' at opposite ends of a diameter and the points AA' and BB' connected respectively to feeder points CC', D'D symmetrically disposed as shown with respect to the loop axis. As will be appreciated, for a figure of eight pattern radiation diagram the points AA' should be at one potential and BB' at another, while for a circular pattern diagram the points AB should be at one potential and the points A'B' at another. The former (figure of eight) mode of action is obtained by means of shorter quarter wave balanced lines CEC' and D'FD which are respectively connected A and A' and B and B' whilst the similar lines CGD' and C'HD which are respectively connected A and B and A' and B' secure action in the latter (circular) mode. The wires of one feeder F1 connect to the middle of the shorting bridges at E and F while those of another F2 are similarly connected to the crossed over connectors at G and H. Owing to the lengths, in terms of the wave length λ adopted for the lines, no potential occurs between G and H due to excitation by the feeder F1 which thus provides the figure-of-eight mode while, similarly no potential occurs between E and F when excitation by the feeder F2 provides the circular mode of operation. The electrical dimensions adopted are indicated, in terms of λ, in Fig. 1. When the feeders F1, F2 are excited in quadrature and with such relative intensity that the field strengths outside the loop on a line at right angles to ABCD' in the plane of the loop due to the two modes are equal, a cardioid polar diagram is produced and this may be rotated by mechanically rotating the aerial system and lines as a unit. In this case, of course, slip rings, capacity couplings or inductive couplings as known per se (preferably inductive couplings) are suitably inserted in the feeds to permit rotation.

Figs. 2 and 3 show two arrangements, of which the latter is preferred, whereby diagram rotation by purely electrical means can be obtained. Referring to Fig. 2 the loop L is interrupted at four places AA', CC', BB' and DD'. ACB and D must be equipotential points for the omnidirectional mode for which also A'C'B' and D' must be at equal but opposite potential. The points PVTR are therefore connected together and to one side of the omnidirectional mode input feeder F2 and points OUSQ are connected to the other side of this feeder. The feed wires PE, VG, TF, RH, OE', UG', SF' and QH' are each substantially a quarter wave in length.

To produce a figure-of-eight diagram opposite quadrants only are excited. Taking the quadrants A'C and B'D the points to be bridged are A'—D and B'—C. This is accomplished by the shorted balanced lines E'II'H and F"J'JG respectively. Similarly taking the alternate quadrants D'A and C'B are bridged by the balance lines H'NN'F and EMM'G' respectively.

The first pair of quadrants named is excited via an external feeder F3 with its wires connected respectively to the shorter bridge II' and JJ' and the second pair is excited by feeder F4 connected to MM' and NN'. In neither case will any potential appear across the feed wires to OQSU and PRTV respectively for the omnidirectional mode, as the centers of the straps connecting all points just named are also the centers of quarter wave balanced bridges connected to points fed at equal and opposite potential by F3 and F4.

Thus O and S are respectively connected to E' and F' which are fed at opposite potential from I and J' respectively. E'OSF' forms a quarter wave balanced bridge across E'F' therefore and the mid-point of OS acquires no potential from any balanced input to IJ'.

Similarly the mid-point of QU acquires no potential from the feed to NM' and so on.

The lengths EPRH, HRTF, FTVG . . . and so on should all be the same, namely substantially half a wave length. In order to secure this result the connections to the points PRTV and OQSU are made by interleaved spider members as shown in Fig. 2, the wires of feeder F2 being constituted by concentric conductors connecting those spider members as shown.

By exciting one pair of opposite quadrants alone (as described) a figure of eight pattern will be produced. By exciting the other pair alone a second figure of eight pattern will be produced at right angles to the first. By combining the two excitations just mentioned a third figure of eight diagram will be produced midway between the two already described, and if the two excitations are derived in proportions determined by a goniometer the figure of eight pattern may have any inclination as determined by the goniometer rotor. Such proportioned excitation is indicated in Fig. 2 by representing the goniometer by its rotor coil RC, to which a common feeder F1 is connected and its stator coils Sc which feed F3 and F4.

The figure of eight pattern may therefore be rotated by rotating the search coil of the goniometer and the cardioid produced by combining it with the omnidirectional mode may be rotated by similar means. If the feed at F2 is in quadrature with feeds F3 and F4 and the intensity relations of the feeds are correct a cardioid will be produced and this can be rotated by rotating the coil RC.

In the embodiment of Fig. 3 all four segments are energized by each of the two goniometer outputs. This involves excitation from any one output along one diameter, the breaks on the other diameter being bridged by the quarter wave balanced lines associated with the other goniometer output. Each of these quarter wave lines produces a voltage reversal so that current flows in the same circumferential direction in the loop segments on each side of the break. As will be seen the loop is interrupted at AA', CC', BB' and DD' and fed, for the omnidirectional mode, by the feeder F2 via the quarter wave feed wires PE, VG, TF, RH, OE', UG', SF' and QH', as in Fig. 2.

For the figure of eight mode the points A and A' are fed at one potential and B and B' at equal but opposite potential from one goniometer stator output coil SCAB via the shorted quarter wave lines E'II'E and F'JJ'F. Current then flows in accordance with voltages developed by this excitation along the paths AD'DB' and A'CC'B the gaps D'D and CC' being bridged by the quarter wave shorted lines H'NN'H and GMM'G'.

In a similar manner currents are made to flow in the paths CA'AD' and C'BB'D by feeding the mid-points of MM' and NN' from the coil SCCD the gaps A'A and BB' being bridged by the quarter wave shorted lines E'II'E and FJ'JF' respectively.

As in Fig. 2 a figure of eight pattern having any inclination may be obtained by a suitable inclination of the goniometer rotor RC, and a cardioid may be provided by simultaneous excitation in both modes. As before F1 and F2 are fed in quadrature.

The whole or selected pairs of the quarter wave (axial) lines may, with advantage, be enclosed in a common screen to prevent radiation from displacement currents where these would be detrimental. Thus, in Fig. 1 each pair of lines joined together at the feeder F' might be separately screened along the whole length, i. e. as far as GH, or both pairs might be within a common screen.

Although aerials consisting of interrupted circular loops have been illustrated this circular shaping is not essential for instead of circular segments between interruptions, the separate paths (e. g. CAB'D incorporating segment AB' in Fig. 1) may be square, or any other desired shape. Again, although not so shown, adjacent segments or paths may overlap.

I claim:

1. An aerial system having a cardioid or similar polar radiation diagram comprising a loop which is interrupted at the opposite ends of at least one bisector, the points on each side of each of the two interruptions being joined by symmetrically disposed parallel substantially radial conductors to two pairs of feed points symmetrically positioned with respect to the axis of said loop and within the same in the plane thereof, there being four pairs of resonant quarter wave lines connected to said feed points, two pairs of lines with each pair of feed points and extending on opposite sides of the plane of said loop, and the lengths round the loop, from one point of a pair of feed points to the corresponding point of the other pair, being substantially half a wave length.

2. An aerial system as set forth in claim 1 wherein the loop is circular and the quarter wave lines run parallel to the axis thereof.

3. An aerial system as set forth in claim 1 wherein two feeder systems are provided for the four pairs of lines, one being a two-wire feeder connected between short circuiting elements at the far ends of one pair of lines, one connected to one pair of adjacent feeder points on the loop and the other with the other, the second feeder system being also a two wire feeder having one wire connected to an element which connected the far end of one wire of one of the remaining pairs of lines with the far end of one wire of the other of said remaining pairs of lines, the remaining wire of said second feeder system being connected to an element which connects the far ends of the wires of the remaining pairs of lines.

4. An aerial system having a cardioid or similar polar diagram and comprising a loop which is interrupted at the ends of two mutually perpendicular bisectors, the points on each side of each of the four interruptions being joined by symmetrically disposed conductors to one of four pairs of feed points which are symmetrically positioned with respect to the axis, there being eight pairs of resonant quarter wave lines connected to said feed points and the lengths round the loop from one point of a pair of feed points to the adjacent point of the next pair being substantially half a wave length.

5. An aerial system having a cardioid or similar polar diagram and comprising a loop which is interrupted at the ends of two mutually perpendicular bisectors, the points on each side of each of the four interruptions being joined by symmetrically disposed conductors to one of four pairs of feed points which are symmetrically positioned with respect to the axis, there being eight pairs of resonant quarter wave lines connected to said feed points and the lengths round the loop from one point of a pair of feed points to the adjacent point of the next pair being substantially half a wave length, the loop being circular and the wires of the quarter wave lines being run parallel with the axis thereof, there being eight wires on one side of the plane containing the loop and eight on the other, each wire on one side being substantially colinear with a wire on the other.

6. An aerial system having a cardioid or similar polar diagram and comprising a loop which is interrupted at the ends of two mutually perpendicular bisectors, the points on each side of each of the four interruptions being joined by symmetrically disposed conductors to one of four pairs of feed points which are symmetrically positioned with respect to the axis, there being eight pairs of resonant quarter wave lines connected to said feed points and the lengths round the loop from one point of a pair of feed points to the adjacent point of the next pair being substantially half a wave length, the loop being circular and the wires of the quarter wave lines being run parallel with the axis thereof, there being eight wires on one side of the plane containing the loop and eight on the other, each wire on one side being substantially colinear with a wire on the other and the wires of the lines being interconnected at the far ends to provide three pairs of feeder terminals, two on one side of the plane of the loop and one on the other.

7. An aerial system having a cardioid or similar polar diagram and comprising a loop which is interrupted at the ends of two mutually perpendicular bisectors, the points on each side of each of the four interruptions being joined by symmetrically disposed conductors to one of four pairs of feed points which are symmetrically positioned with respect to the axis, there being eight pairs of resonant quarter wave lines connected to said feed points and the lengths round the loop from one point of a pair of feed points to the adjacent point of the next pair being substantially half a wave length, the loop being circular and the wires of the quarter wave lines being run parallel with the axis thereof, there being eight wires on one side of the plane containing the loop and eight on the other, each wire on one side being substantially co-linear with a wire on the other and the wires of the lines being interconnected at the far ends to provide three pairs of feeder terminals, two on one side of the plane of the loop and one on the other, a radio goniometer having rotor and stator coils, said feeds to said two pairs of terminals being made from a common feeder through connections of said radio goniometer so that these two feeds are taken from the stator coils of said goniometer while a separate feeder is connected to said one pair of terminals, the loop currents corresponding to the last mentioned feed being in quadrature with those corresponding to the feed from the others.

NEWSOME HENRY CLOUGH.

References Cited in the file of this patent

UNITED STATES PATENTS

| Number | Name | Date |
|---|---|---|
| 2,190,816 | Wheeler | Feb. 20, 1940 |
| 2,239,724 | Lindenblad | Apr. 29, 1941 |
| 2,241,918 | Muller | May 13, 1941 |
| 2,253,958 | Luck | Aug. 26, 1941 |
| 2,298,449 | Bailey | Oct. 13, 1942 |
| 2,424,968 | Busignies | Aug. 5, 1947 |
| 2,532,920 | Johnson | Dec. 5, 1950 |